(12) United States Patent
Rich et al.

(10) Patent No.: US 10,122,693 B2
(45) Date of Patent: Nov. 6, 2018

(54) PROTOCOL BASED KEY MANAGEMENT

(75) Inventors: Bruce Arland Rich, Austin, TX (US); Krishna Kishore Yellepeddy, Austin, TX (US); Xiaoyan Y Zhang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1902 days.

(21) Appl. No.: 12/910,905

(22) Filed: Oct. 25, 2010

(65) Prior Publication Data

US 2012/0099728 A1  Apr. 26, 2012

(51) Int. Cl.
*H04L 9/14* (2006.01)
*H04L 29/06* (2006.01)

(52) U.S. Cl.
CPC ............ *H04L 63/06* (2013.01); *H04L 63/102* (2013.01)

(58) Field of Classification Search
CPC ............................. H04L 63/06; H04L 63/102
USPC ................ 380/277, 381; 713/163, 168, 175; 726/29
See application file for complete search history.

(56) References Cited

U.S. PATENT DOCUMENTS

| | | | | |
|---|---|---|---|---|
| 7,246,378 B1 * | 7/2007 | Marvit | ................ | H04L 12/5885 380/277 |
| 7,743,249 B1 * | 6/2010 | Zucker | .................... | H04L 9/065 713/163 |
| 2003/0059053 A1 * | 3/2003 | Medvinsky | ............. | G06F 21/10 380/277 |
| 2003/0093694 A1 | 5/2003 | Medvinsky et al. | | |
| 2004/0247118 A1 * | 12/2004 | Tateno | .................. | G06F 21/445 380/44 |
| 2005/0055570 A1 | 3/2005 | Kwan et al. | | |
| 2005/0283608 A1 * | 12/2005 | Halcrow | ............ | G06Q 20/3674 713/175 |
| 2007/0055887 A1 | 3/2007 | Cross et al. | | |
| 2008/0085004 A1 * | 4/2008 | Kitaj | ..................... | H04L 9/0822 380/281 |
| 2008/0307054 A1 * | 12/2008 | Kamarthy | ............. | H04L 63/065 709/206 |
| 2008/0319857 A1 | 12/2008 | Dobbins et al. | | |
| 2009/0204808 A1 | 8/2009 | Guo et al. | | |
| 2009/0265561 A1 * | 10/2009 | Bromley | ............... | H04L 9/0836 713/189 |
| 2010/0061555 A1 * | 3/2010 | Ducharme | ............ | G06F 21/602 380/277 |
| 2010/0064137 A1 * | 3/2010 | McGrew | ............... | H04L 9/0833 713/168 |

(Continued)

*Primary Examiner* — Joseph P Hirl
*Assistant Examiner* — Sayed Beheshti Shirazi
(74) *Attorney, Agent, or Firm* — Garg Law Firm, PLLC; Jeffrey S. LaBaw

(57) ABSTRACT

A method, system, and computer usable program product for protocol based key management are provided in the illustrative embodiments. A key management protocol associated with a key request is identified, the key request being a request for data usable in cryptographic security. A first subset is selected from a set of policies using the key management protocol. A set of permissions is computed based on the first subset of policies, the set of permissions indicating whether the key request is permitted under the key management protocol. The set of permissions is cached in a cache in a data storage device.

20 Claims, 4 Drawing Sheets

(56) References Cited

U.S. PATENT DOCUMENTS

2010/0189262 A1* 7/2010 Ducharme ............ G06F 21/602
　　　　　　　　　　　　　　　　　　　　　　　380/277
2011/0164752 A1* 7/2011 Wainner .............. H04L 63/0428
　　　　　　　　　　　　　　　　　　　　　　　380/277

* cited by examiner

PROTOCOL BASED KEY MANAGEMENT

BACKGROUND OF THE INVENTION

1. Field of the Invention

The present invention relates generally to an improved data processing system, and in particular, to a computer implemented method for improving the efficiency in providing security information. More particularly, the present invention relates to a computer implemented method, system, and computer usable program code for protocol based key management in a data processing environment.

2. Description of the Related Art

Data is often exchanged between systems using some form of security. For example, a transmission may include data that has been encrypted using some encryption standard, such as an asymmetric key-pair. As another example, a message may be signed for authenticity, such as by using the private key associated with a digital certificate. Keys, codes, passwords, certificates, are some examples of security features used for securing data.

The security features are often stored and managed in some management system using certain policies that may apply to the use of those security features. For example, one user may be able to use a particular security feature, such as a certificate, for one part of a website but not for another part.

An entity, such as a system, an application, or a user may request a particular security measure, such as a key, from a management system. For example, a server may request a key for encrypting data to be transmitted. An application may request a key for decrypting encrypted data. A device, such as a tape drive, may request a key for encrypting data for storage or retrieving stored encrypted data. A server may request a certificate for establishing or validating a secure communication link.

When an entity requests a security feature, such as a key or a certificate, the management system processes and responds to such requests in accordance with certain policies. Generally, the policies used for servicing key requests are designed to establish that the requestor has appropriate ownership rights to the requested key before the request is granted.

SUMMARY OF THE INVENTION

The illustrative embodiments provide a method, system, and computer usable program product for protocol based key management. An embodiment identifies a key management protocol associated with a key request, the key request being a request for data usable in cryptographic security. The embodiment selects a first subset from a set of policies using the key management protocol. The embodiment computes a set of permissions based on the first subset of policies, the set of permissions indicating whether the key request is permitted under the key management protocol. The embodiment caches the set of permissions in a cache in a data storage device.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
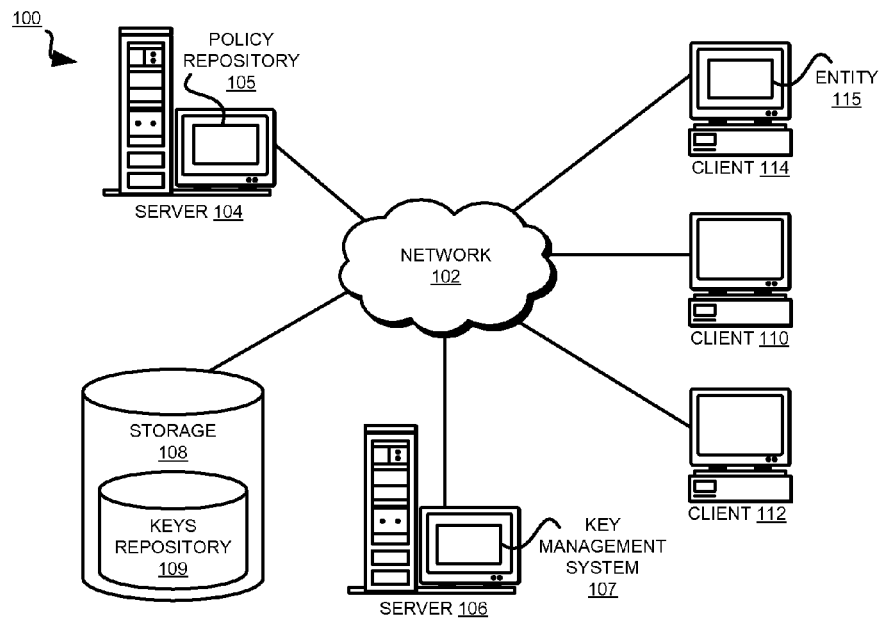
FIG. 1 depicts a pictorial representation of a network of data processing systems in which the illustrative embodiments may be implemented.

For the purposes of this disclosure keys, certificates, codes, or any other data usable for cryptographic security of information is referred to as a key. An embodiment described with respect to a key can be used with respect to any type of security feature without limitation within the scope of the invention. A key management system according to the invention may be implemented for managing any type of security measures and for handling requests there for.

The invention recognizes that processing key requests involves computationally expensive permissions computations. A permission is an indication of an authorized action based on the logic of a policy. The invention recognizes that a policy may compute to multiple permissions with only some being applicable to a given request. Similarly, multiple policies may apply to the request, the computations using those policies may result in multiple permissions, and only some of those permissions may apply to the given request under the given circumstances.

Presently, the policies used for processing key requests compute into permissions that inform about the entities are authorized to send a particular key request. The invention recognizes that the group of permissions that apply to requestor entities and requestor entity groups can be substantial. Consequently, the computations of permissions of requestor entities or requestor entity groups can be a significant computational expense for present key management systems.

The invention recognizes that a key request is transmitted by a requestor entity using a key management protocol. Some examples of key management protocols are Key Management Interoperability protocol (KMIP) and T10 protocol from the PKI consortium. Many other standard and proprietary key management protocols may exist and are usable in conjunction with an embodiment of the invention as described herein.

The invention further recognizes that selection of policies that may be applicable to a request based on the protocol of the request may reduce the computational load on the key management system for computing the permissions applicable to the request. The invention further recognizes that selecting the policies based on the protocol and further reducing the selected policies, such as by eliminating policies not applicable to the requestor entity, entity group, or request type, may further reduce the computational load by significantly narrowing the applicable policies.

The invention further recognizes that caching certain selected policies, policy subsets, or permissions computed there from, may further reduce the computational load. The invention recognizes that reduction in the workload for computing the permissions for a specific key request may improve the overall performance of key management systems.

The illustrative embodiments used to describe the invention generally address and solve the above-described problems and other problems related to key management and responding to key requests. The illustrative embodiments of the invention provide a method, computer usable program product, and data processing system for protocol based key management. An embodiment of the invention may enable an existing key management system to compute permissions for a request by selecting applicable policies based on the protocol of the request in combination with other factors.

The illustrative embodiments are described with respect to data, data structures, and identifiers only as examples. Such descriptions are not intended to be limiting on the invention. For example, an illustrative embodiment described with respect to single piece of information may be implemented using a combination of several pieces of information, in a similar manner within the scope of the invention.

Furthermore, the illustrative embodiments may be implemented with respect to any type of data processing system. For example, an illustrative embodiment described with respect to a single-processor standalone data processing system may be implemented in a multiprocessor logical partition system, or any other organization of data processing systems, such as rack configurations in a data center, within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to numeric attribute may be implemented using an alphanumeric attribute, a symbolic attribute, or a combination thereof, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. or Oracle Corporation in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
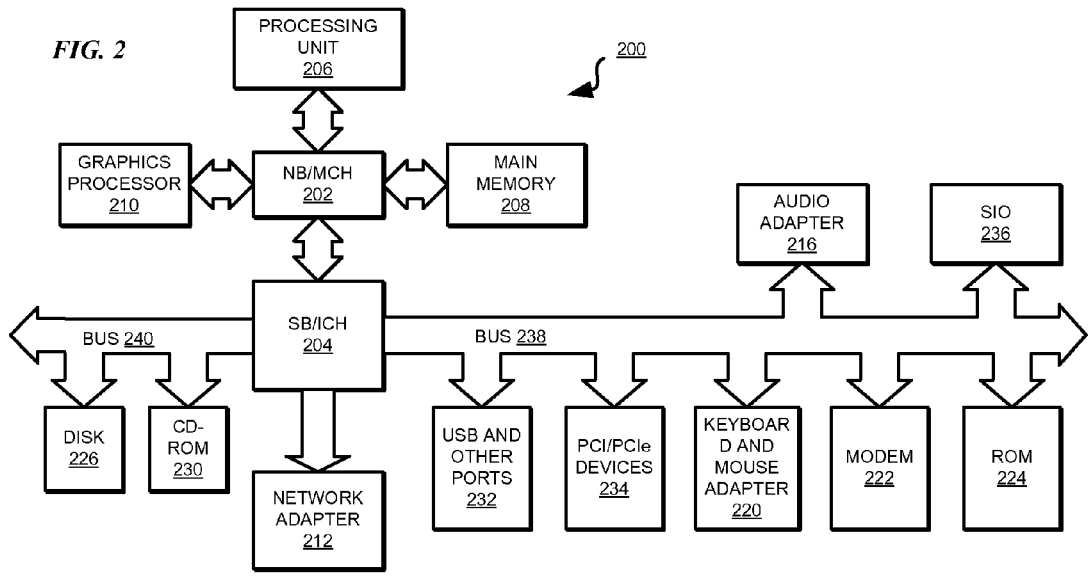
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include policy repository 105. Policy repository 105 may store a set of policies that may be applicable to key management in a given data processing environment. A set of policies is one or more policies. Server 106 may include key management system 107. Key management system 107 may be one form an application implementing an illustrative embodiment. Storage 108 may include key repository 109. Key repository 109 may be a repository of any suitable form usable to store keys. Client 114 may include entity 115. Entity 115 may be a system or an application that may make a key request, or using which a key request may be sent by a user, such as an administrator.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc. or Oracle Corporation in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
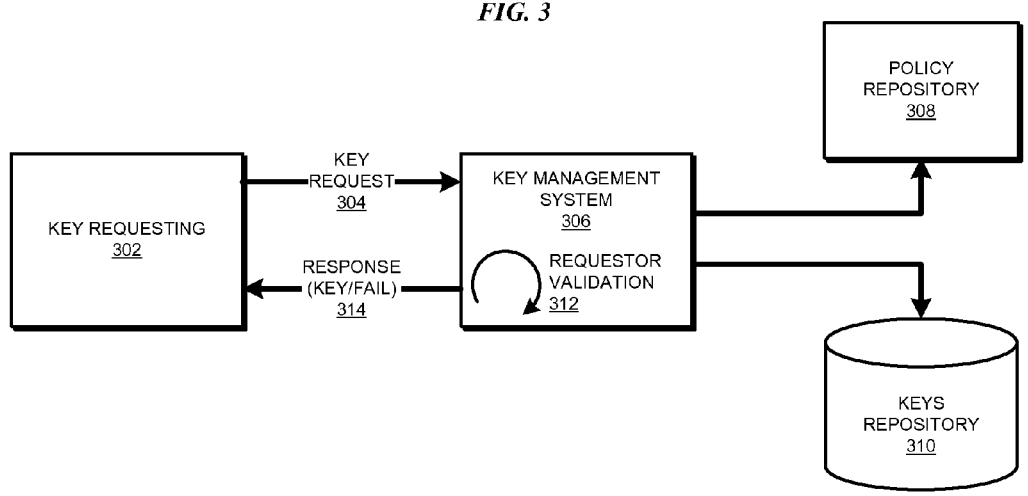
FIG. 3 depicts a block diagram of an example key request transaction with respect to which an illustrative embodiment may be implemented.

With reference to FIG. 3, this figure depicts a block diagram of an example key request transaction with respect to which an illustrative embodiment may be implemented. Key requesting entity 302 may be any entity capable of sending key request 304 to key management system 306. Key management system 306 may interact with internal or external policy repository 308 and key repository 310.

Upon receiving key request 304, key management system 306 presently performs requestor validation 312 to determine whether to service key request 304. As described above, requestor validation 312 primarily involves selection and extraction of policies applicable to entity 302 or a group to which entity 302 belongs. Permissions are computed using the extracted policies and a determination is made whether those permissions are sufficient to provide the key requested in key request 304. If the permissions are sufficient, response 314 includes the requested key. If the permissions are insufficient, response 314 is sent with a failure notification.

Figure 4:
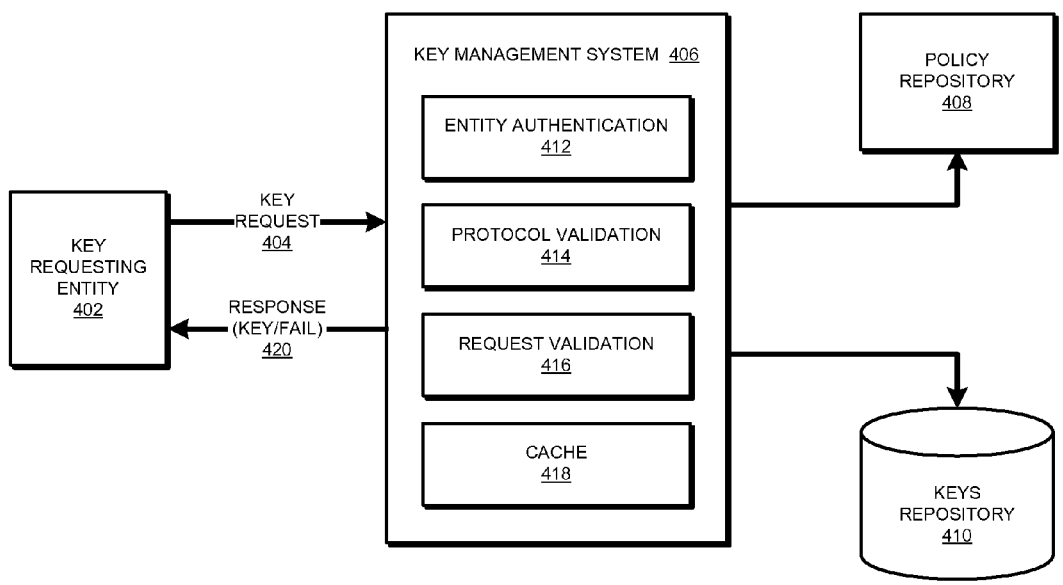
FIG. 4 depicts block diagram of a modified key management system in accordance with an illustrative embodiment.

With respect to FIG. 4, this figure depicts block diagram of a modified key management system in accordance with an illustrative embodiment. Entity 402, key request 404, key management system 406, policy repository 408, and key repository 410 are substantially similar to their corresponding artifacts in FIG. 3, except the modifications to key management system 406 as described in an embodiment herein.

Entity 402 transmits key request 404 over a key management protocol, such as KMIP, T10, or another similarly purposed protocol. Upon receiving key request 404, key management system 406 authenticates entity 402 using entity authentication component 412. Key management system 406 may access policy repository 408 to retrieve the policy information usable for such authentication. Entity authentication component 412 determines whether entity 402, a group to which entity 402 belongs, or both, are authorized to send request 404.

Key management system 406, as modified using an embodiment of the invention, further detects and validates the protocol of request 404 using protocol validation component 414. Key management system 406 computes the permissions entity 402 has based on the protocol on which request 404 came in. Key management system 406 may use a set of policies from policy repository 408 for this protocol validation function.

An entity may be able to transmit the same or similar key request 404 over different key management protocols. In one embodiment, according to a policy in policy repository 408, entities in a data processing environment may be authorized to send key request 404 to key management system 406 only using a particular protocol. In other words, a policy may compute to a permission that allows an entity, such as entity 402, to send key request 404 only over a certain protocol and rejects key request 404 if the request is transmitted over a different protocol. In another embodiment, a subsequent request from the entity 402 may use a different protocol and key management system 406 may compute new permissions, as entity 402 may have additional permissions in the context of the new protocol.

Request validation component 416 may further validate whether request 404 as presented by entity 402 over the selected protocol is valid. For example, request validation component 416 may determine that entity 402 may be authorized to use the selected protocol for request 404, but request 404 may be semantically, chronologically, logically, or structurally incorrect.

Cache 418 may be a memory storage associated with key management system 406. Policy subsets selected or reduced from a policy set, permissions computed there from, by any of components 412, 414, 416, or a combination thereof may be stored in cache 418. For example, permissions may be computed based on a subset of policies at protocol validation component 414 that entities in a data processing environment are authorized to send key request 404 to key management system 406 only using a particular protocol. Such computation, once performed, can be omitted for subsequent occurrences of requests similar to request 404 by storing the computed permissions in cache 418.

For example, when another entity sends a request similar to key request 404, protocol validation component 414 need not select and extract permissions from policy repository 408 and compute the protocol permissions again. Protocol validation component 414 may simply look up cache 418 for the permissions associated with the protocol being used by the entity.

Similarly, once the permissions have been computed for protocol validation by component 414 and for entity authentication by entity authentication component 412, those permissions can also be cached in cache 418. When the same entity or another entity from the same group sends a request using the same protocol, those permissions computations can be avoided by looking up cache 418.

In one embodiment, if a subsequent request from the same entity or group comes in on a different protocol, key management system 406 may compute a new permission, as the entity or group may have additional or different permissions in the context of this new protocol. The cached permissions in cache 418 may be extended or modified to include permissions associated with the different protocols authorized for entity 402 or its group so this permissions need not have to be computed every time a entity 402 or a member of its group makes a similar request using one of the already validated protocols to key management system 406.

The specific permissions or results of computations that are cached as described above are described only as examples and not limitations on the invention. Permissions or results of policy computations at any stage in key management process can be similarly cached using cache 418 within the scope of the invention.

Furthermore, additional factors may be considered in computing the permissions within the scope of the invention. For example, entity 402 may have a specific role assigned to the entity. Within the scope of the invention, permissions may be computed for whether that entity, acting in that role, may send that request using that protocol, at that time, in that order, to that key management system, for that particular key.

Following affirmative permissions from protocol validation, entity validation, and request validation operations, key management system 406 may send response 420 to entity 402 including the requested key. Alternatively, response 420 may include a failure notification, or response 420 may not be sent at all if one or more permissions are negative.

Figure 5:
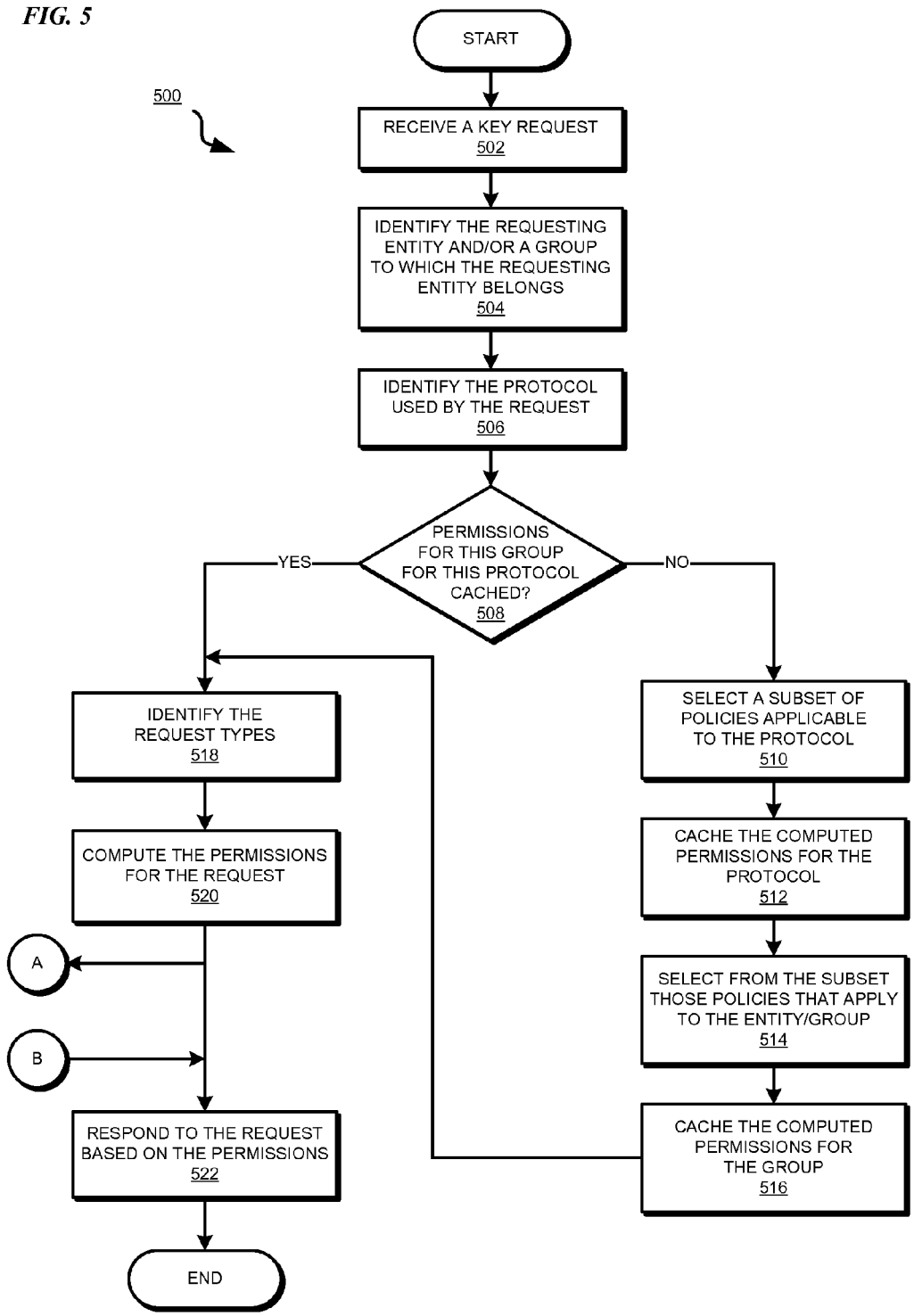
FIG. 5 depicts a flowchart of an example process of protocol based key management in accordance with an illustrative embodiment.

With reference to FIG. 5, this figure depicts a flowchart of an example process of protocol based key management in accordance with an illustrative embodiment. Process 500 may be implemented in key management system 406 in FIG. 4, using one or more components thereof.

Process 500 begins by receiving a key request (step 502). Process 500 identifies the entity sending the request of step 502, a group to which the entity belongs, or both (step 504). Process 500 identifies the protocol being used by the request (step 506).

Process 500 determines whether a set of permissions for the identified group and the identified protocol are available in the cache (step 508). A set of permissions is one or more permissions. In one embodiment, step 508 may determine the availability in cache of only the permissions for the identified protocol, with process 500's steps being modified accordingly (not shown).

If those permissions are not available in the cache ("No" path of step 508), process 500 may select a subset of policies applicable to the identified protocol (step 510). Process 500 may cache the permissions computed from the selected subset of policies for the identified protocol (step 512).

Process 500 may further reduce the subset of policies of step 510 to a subset of those policies that apply to the entity or the group of the entity that sent the request of step 502 (step 514). Process 500 may cache the permissions computed from the subset of step 514 (step 516). Process 500 proceeds to step 518.

Process 500 also proceeds to step 518 if the permissions are cached ("Yes" path of step 508). Process 500 identifies the request type (step 518). Process 500 computes the permissions applicable to that type of request (step 520). The computations of steps 512, 516, and 520 may be regarded as being progressively narrowing set of permissions starting at protocol based permissions. Accordingly, the computations of step 520 may derive from the computed or cached computations of step 516.

The progressively narrowing of permissions is not intended to imply any particular order in permissions computation after the protocol permissions are identified. The computed permission set or the selected policies subset may be narrowed in any order of factors suitable to a particular implementation.

Figure 6:
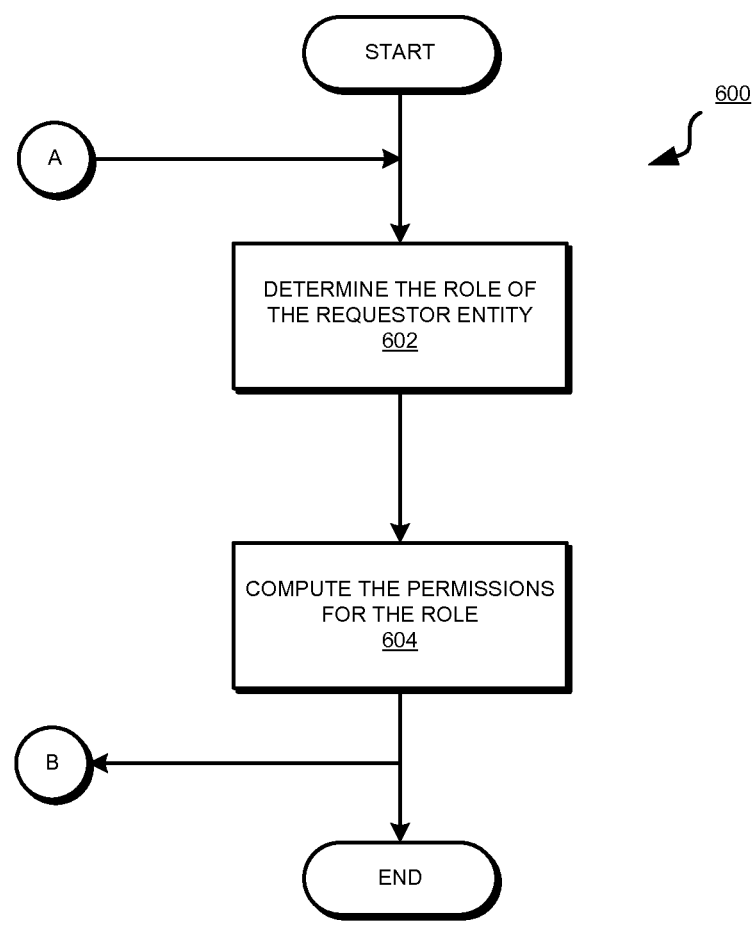
FIG. 6 depicts a flowchart of an example optional enhancement to the protocol based key management process in accordance with an illustrative embodiment.

In one embodiment, process 500 may exit at exit point marked "A" to enter process 600 in FIG. 6. Process 600 may re-enter at entry point "B" and continue execution.

Process 500 responds to the request based on the permissions resulting in step 520 or upon reentry at entry point "B" (step 522). Process 500 ends thereafter.

With reference to FIG. 6, this figure depicts a flowchart of an example optional enhancement to the protocol based key management process in accordance with an illustrative embodiment. Process 600 may be implemented where process 500 in FIG. 5 is implemented.

Process 600 begins by determining the role of the entity sending the key request, such as the request received in step 502 in FIG. 5 (step 602). Another process, such as process 500 in FIG. 5, may enter process 600 at step 602 via entry point marked "A".

Process 600 computes the permissions applicable to that role (step 604). Process 600 ends thereafter, or exits at exit point marked "B" to enter process 500 in FIG. 5 at the corresponding entry point marked "B".

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for protocol based key management. Using an embodiment of the invention, permissions relevant to processing a key request can be determined more efficiently than the present method of key management. The computed permissions may be cached for the protocol, the group of the requestor entity, or any combination thereof. The caching of permissions at such levels of narrowing permissions may enable a key management system to process key request more efficiently as compared to present key request handling processes. An embodiment may be implemented in conjunction with an existing key management system and the combination may demonstrate improved overall system performance.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for protocol based key management, the computer implemented method comprising:
    identifying a key management protocol associated with a key request, the key management protocol being one of a plurality of key management protocols supported by a key management system;
    selecting a first subset from a set of policies using the key management protocol;
    computing a set of permissions based on the first subset of policies, the set of permissions indicating whether the key request is permitted under the key management protocol, wherein the set of permissions in a protocol based key management system is computationally smaller than a possible set of permissions computable for the key request, and wherein the first subset of policies based on the key management protocol causes the set of permissions to be computer with a smaller computational cost than the possible set of permissions; and
    caching the set of permissions in a cache in a data storage device.

2. The computer implemented method of claim 1, further comprising:
    receiving the key request at a key management system from a requestor entity;
    identifying a group to which the requestor entity belongs;
    determining whether a permission for the group and the key management protocol exists in the cache; and
    responsive to the determining being affirmative, using the permission from the cache to process the key request.

3. The computer implemented method of claim 2, further comprising:
    responsive to the determining being negative, computing a subset of permissions from the set of permissions, the subset of permissions indicating whether the group is permitted to send the key request under the key management protocol; and
    caching the subset of permissions in the cache.

4. The computer implemented method of claim 1, further comprising:
    identifying a request type associated with the key request;
    computing a permission, wherein the computing uses the set of permissions and a second subset of the set of policies, the permission indicating whether the request type is permitted on the key management protocol; and
    using the permission to process the key request.

5. The computer implemented method of claim 4, wherein using the permission to process the request further comprises:
    responsive to the permission being affirmative, sending a response to a sender of the key request, the response providing a key to the sender.

6. The computer implemented method of claim 1, further comprising:
    identifying a role of a sender of the key request;
    computing a permission, wherein the computing uses the set of permissions and a third subset of the set of policies, the permission indicating whether the sender in the identified role is permitted to send the key request using the key management protocol; and
    using the permission to process the key request.

7. A computer usable program product comprising a computer usable non-transitory storage medium including computer usable code for protocol based key management in a protocol based key management system, the computer usable code comprising:
    computer usable code for identifying a key management protocol associated with a key request, the key management protocol being one of a plurality of key management protocols supported by a key management system;
    computer usable code for selecting a first subset from a set of policies using the key management protocol;
    computer usable code for computing a set of permissions based on the first subset of policies, the set of permissions indicating whether the key request is permitted under the key management protocol, wherein the set of permissions in the protocol based key management system is computationally smaller than a possible set of permissions computable for the key request, and wherein the first subset of policies based on the key management protocol causes the set of permissions to be computed with a smaller computational cost than the possible set of permissions; and
    computer usable code for caching the set of permissions in a cache in a data storage device.

8. The computer usable program product of claim 7, further comprising:
    computer usable code for receiving the key request at a key management system from a requestor entity;
    computer usable code for identifying a group to which the requestor entity belongs;
    computer usable code for determining whether a permission for the group and the key management protocol exists in the cache; and
    computer usable code for responsive to the determining being affirmative, using the permission from the cache to process the key request.

9. The computer usable program product of claim 8, further comprising:
    computer usable code for responsive to the determining being negative, computing a subset of permissions from the set of permissions, the subset of permissions indicating whether the group is permitted to send the key request under the key management protocol; and computer usable code for caching the subset of permissions in the cache.

10. The computer usable program product of claim 7, further comprising:

computer usable code for identifying a request type associated with the key request;

computer usable code for computing a permission, wherein the computing uses the set of permissions and a second subset of the set of policies, the permission indicating whether the request type is permitted on the key management protocol; and computer usable code for using the permission to process the key request.

11. The computer usable program product of claim 10, wherein using the permission to process the request further comprises:

computer usable code for responsive to the permission being affirmative, sending a response to a sender of the key request, the response providing a key to the sender.

12. The computer usable program product of claim 7, further comprising:

computer usable code for identifying a role of a sender of the key request;

computer usable code for computing a permission, wherein the computing uses the set of permissions and a third subset of the set of policies, the permission indicating whether the sender in the identified role is permitted to send the key request using the key management protocol; and computer usable code for using the permission to process the key request.

13. The computer usable program product of claim 7, wherein the computer usable code is stored in a computer readable storage medium in a data processing system, and wherein the computer usable code is transferred over a network from a remote data processing system.

14. The computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

15. A protocol based key management system for protocol based key management, comprising:

a storage device including a storage medium, wherein the storage device stores computer usable program code; and a processor, wherein the processor executes the computer usable program code, and wherein the computer usable program code comprises:

computer usable code for identifying a key management protocol associated with a key request, the key management protocol being one of a plurality of key management protocols supported by a key management system;

computer usable code for selecting a first subset from a set of policies using the key management protocol;

computer usable code for computing a set of permissions based on the first subset of policies, the set of permissions indicating whether the key request is permitted under the key management protocol, wherein the set of permissions in the protocol based key management system is computationally smaller than a possible set of permissions computable for the key request, and wherein the first subset of policies based on the key management protocol causes the set of permissions to be computed with a smaller computational cost than the possible set of permissions; and computer usable code for caching the set of permissions in a cache in a data storage device.

16. The protocol based key management system of claim 15, further comprising:

computer usable code for receiving the key request at a key management system from a requestor entity;

computer usable code for identifying a group to which the requestor entity belongs;

computer usable code for determining whether a permission for the group and the key management protocol exists in the cache; and computer usable code for responsive to the determining being affirmative, using the permission from the cache to process the key request.

17. The protocol based key management system of claim 16, further comprising:

computer usable code for responsive to the determining being negative, computing a subset of permissions from the set of permissions, the subset of permissions indicating whether the group is permitted to send the key request under the key management protocol; and computer usable code for caching the subset of permissions in the cache.

18. The protocol based key management system of claim 15, further comprising:

computer usable code for identifying a request type associated with the key request;

computer usable code for computing a permission, wherein the computing uses the set of permissions and a second subset of the set of policies, the permission indicating whether the request type is permitted on the key management protocol; and computer usable code for using the permission to process the key request.

19. The protocol based key management system of claim 18, wherein using the permission to process the request further comprises:

computer usable code for responsive to the permission being affirmative, sending a response to a sender of the key request, the response providing a key to the sender.

20. The protocol based key management system of claim 15, further comprising:

computer usable code for identifying a role of a sender of the key request;

computer usable code for computing a permission, wherein the computing uses the set of permissions and a third subset of the set of policies, the permission indicating whether the sender in the identified role is permitted to send the key request using the key management protocol; and computer usable code for using the permission to process the key request.

* * * * *